United States Patent [19]

Arai

[11] Patent Number: 5,123,004
[45] Date of Patent: Jun. 16, 1992

[54] RECORDING AND/OR REPRODUCING APPARATUS HAVING A VERTICALLY MOVABLE DISK CHASSIS AND ARRANGED TO PREVENT EXTERNAL FORCES FROM DISRUPTING PROPER OPERATIONS

[75] Inventor: Yasunori Arai, Kodaira, Japan

[73] Assignee: 501 Nakamichi Corporation, Kodaira, Japan

[21] Appl. No.: 381,056

[22] Filed: Jul. 17, 1989

[30] Foreign Application Priority Data

Jul. 17, 1988 [JP] Japan ............................... 63-177521
Jul. 17, 1988 [JP] Japan ............................... 63-177522

[51] Int. Cl.$^5$ ...................... G11B 33/02; G11B 17/04; G11B 23/00
[52] U.S. Cl. ............................. 369/75.2; 360/99.06; 360/99.02; 369/77.2; 369/263; 369/270
[58] Field of Search ............. 360/99.02, 99.03, 99.06, 360/99.07; 369/77.1, 77.2, 75.2, 263, 270

[56] References Cited

U.S. PATENT DOCUMENTS

| | | | |
|---|---|---|---|
| 4,358,841 | 11/1982 | Carroll et al. | 369/77 |
| 4,399,528 | 8/1983 | Suzuki | 369/77 |
| 4,410,971 | 10/1983 | Eisemann | 369/75 |
| 4,450,549 | 5/1984 | Ikedo et al. | 369/75.1 |
| 4,628,498 | 12/1986 | Takamatsu et al. | 369/77.1 |
| 4,653,039 | 3/1987 | Ueno et al. | 369/75.2 |
| 4,707,819 | 11/1987 | Ehara | 369/77.2 |
| 4,719,526 | 1/1988 | Okita et al. | 360/99.06 |
| 4,731,777 | 3/1988 | Yoshigoshi et al. | 369/263 |
| 4,740,937 | 4/1988 | Watanabe | 360/99.06 |
| 4,764,917 | 8/1988 | Sugihara et al. | 369/77.1 |
| 4,777,550 | 10/1988 | Taguchi et al. | 360/97 |
| 4,786,998 | 11/1988 | Sugawaro et al. | 360/99.07 |
| 4,799,209 | 1/1989 | Grobben | 360/99.07 |
| 4,809,252 | 2/1989 | Ikedo et al. | 369/34 |
| 4,829,504 | 5/1989 | Sunaga et al. | 369/75.2 |
| 4,841,499 | 6/1989 | Takahashi et al. | 369/38 |
| 4,864,440 | 9/1989 | Satoh et al. | 360/99.02 |
| 4,893,210 | 1/1990 | Mintzlaff | 360/137 |
| 4,926,406 | 5/1990 | Ikedo et al. | 369/36 |
| 4,937,806 | 6/1990 | Babson et al. | 369/75.1 |

Primary Examiner—A. J. Heinz
Assistant Examiner—Jefferson Evans
Attorney, Agent, or Firm—Dykema Gossett

[57] ABSTRACT

A disc drive particularly adapted to perform recording and/or reproducing operation with respect to a disc cartridge containing a magneto optical disc is composed of a main chassis for mounting thereon a pick-up mechanism, a loading chassis for accommodating the disc cartridge and vertically shiftable between its lower operative position and upper retracted position, a bias magnet mounted on the loading chassis for applying a magnetic field to the disc when the loading chassis is in the lower operative position, and a sliding plate slidably arranged on the main chassis for shifting the loading chassis between two positions along with sliding movement thereof. The bias magnet is shiftable substantially in a vertical direction with respect to the loading chassis and therefore separatable from the latter when the latter is in the upper retracted position for allowing smooth insertion of the disc cartridge.

5 Claims, 17 Drawing Sheets

RECORDING AND/OR REPRODUCING APPARATUS HAVING A VERTICALLY MOVABLE DISK CHASSIS AND ARRANGED TO PREVENT EXTERNAL FORCES FROM DISRUPTING PROPER OPERATIONS

BACKGROUND OF THE INVENTION

This invention relates to a recording and/or reproducing apparatus for use in combination with a disc cartridge containing a magneto optical disc.

A typical type of the conventional disc drive is composed substantially of a base plate on which mechanisms, including a pick-up device and a spindle required for the recording/reproducing operation, a sliding plate attached slidably to the base plate and a loading chassis for accommodating a disc cartridge. The loading chassis is moveable in a vertical direction between an operative position wherein it is located near the base plate to be ready for the recording/reproducing operation and a standby position wherein it is retracted from the base plate. The loading chassis ascends along with advancement of the sliding plate in the cartridge ejecting operation and, in turn, descends along with insertion of the disc cartridge into the loading chassis. More particularly, as the sliding plate is advanced against a biasing force of a spring connected thereto, the loading chassis which has been standing in the lower operative position is elevated toward the upper standby position due to engagement between guide rollers protruded outwardly from opposite sides of loading chassis and upwardly inclined cam ridges of walls upstanding from opposite sides of sliding plate. There is also provided means for retaining the sliding plate in the fully-advanced position which causes the loading chassis to remain stationery in the standby position. Such locked condition of the sliding plate is released when the disc cartridge is inserted to the loading chassis which has been held in the standby position, whereupon the sliding plate is sprung back toward the cartridge unloading direction to thereby descend the loading chassis toward the lower operative position.

With the disc drive used for a disc cartridge containing a magneto optical disc, a bias magnet is arranged in a position opposite to the pick-up mechanism for applying a bias magnetic field to recording area of the disc at a time of recording. The bias magnet should be positioned to leave a predetermined small interval, of the order of $1_{mm}$, between its magnetic pole section and the disc face, which would be obstructive to the cartridge insertion into a space defined between the bias magnet and the pick-up mechanism.

SUMMARY OF THE INVENTION

It is therefore a principle object of the invention to provide a recording and/or reproducing apparatus capable of eliminating the disadvantages of the prior art, and wherein, along with sliding movement of a sliding plate, a cartridge loading chassis is shifted between two positions, while a bias magnet is shifted with respect to the cartridge loading chassis.

Another object of the invention is to provide a shift mechanism which will suitably be used in a magneto optical disc drive for shifting a bias magnet with respect to a magneto optical disc in accordance with sliding movement of a sliding plate.

Still another object of the invention is to provide a recording/reproducing apparatus which is free from external oscillation which might otherwise be applied thereto during recording/reproducing operation.

In accordance with an aspect of the invention, there is provided a recording and/or reproducing apparatus including a main chassis on which recording/reproducing mechanisms including a pick-up mechanism is mounted; a loading chassis adapted to accommodate a disc cartridge and shiftable between a first position in which recording/reproducing operation can be performed with respect to a disc contained in the disc cartridge and a second position retracted away from the pick-up mechanism; a bias magnet mounted on the loading chassis for applying a magnetic field to the disc and shiftable between a first position closer to the disc and a second position retracted away from the disc; a sliding plate slideably arranged on the main chassis for shifting the loading chassis between its first and second positions along with sliding movement thereof; and means mounted on the loading chassis for shifting the bias magnet between its first and second positions along with sliding movement of the sliding plate. The shift means includes a pivotable arm member adapted to be brought into contact with an extended portion of the sliding plate so that the bias magnet can be shifted between two positions upon rotation of the arm member. Such contact between the arm member and the sliding plate is released when the bias magnet has reached its first position.

In accordance with another aspect of the invention, there is provided a shift mechanism for shifting a second body relative to a first body between first and second positions, which comprises a sliding plate slidably arranged on the first body; means for biasing the second body toward the first position; first guide means for supporting a first end of the second body to the first body in such manner that the first end of the second body may be guided, against the biasing means, in a direction oblique to a sliding direction of the sliding plate; and second guide means for supporting a second end, opposite to the first end, of the second body to the sliding plate in such manner that the second body is rotated about the first end in a first stage of sliding movement of the sliding plate, and in a subsequent second stage the second end of the second body is moved in the sliding direction of the sliding plate and, at the same time the first end of the second body is guided in the oblique direction by cooperation with the first guide means.

BRIEF DESCRIPTION OF THE DRAWINGS

The above and other objects and features of the invention will be apparent from the following description of a preferred embodiment thereof when read in conjunction with the accompanying drawings in which.

DETAILED DESCRIPTION OF PREFERRED EMBODIMENT

Referring specifically to FIG. 1 to FIG. 6, a disc drive embodying the present invention is designed to record and reproduce information on a magneto optical disc contained in a hard plastic jacket, which is referred to in the following description as a disc cartridge. The disc drive comprises substantially a main chassis 10, a pick-up base 12 attached above main chassis 10, a loading chassis 14 supported above pick-up base 12 for accommodating the disc cartridge, and a sliding plate 16 adapted to cause loading chassis 14 to move up and down along with insertion and discharge of the disc cartridge.

Figure 3:
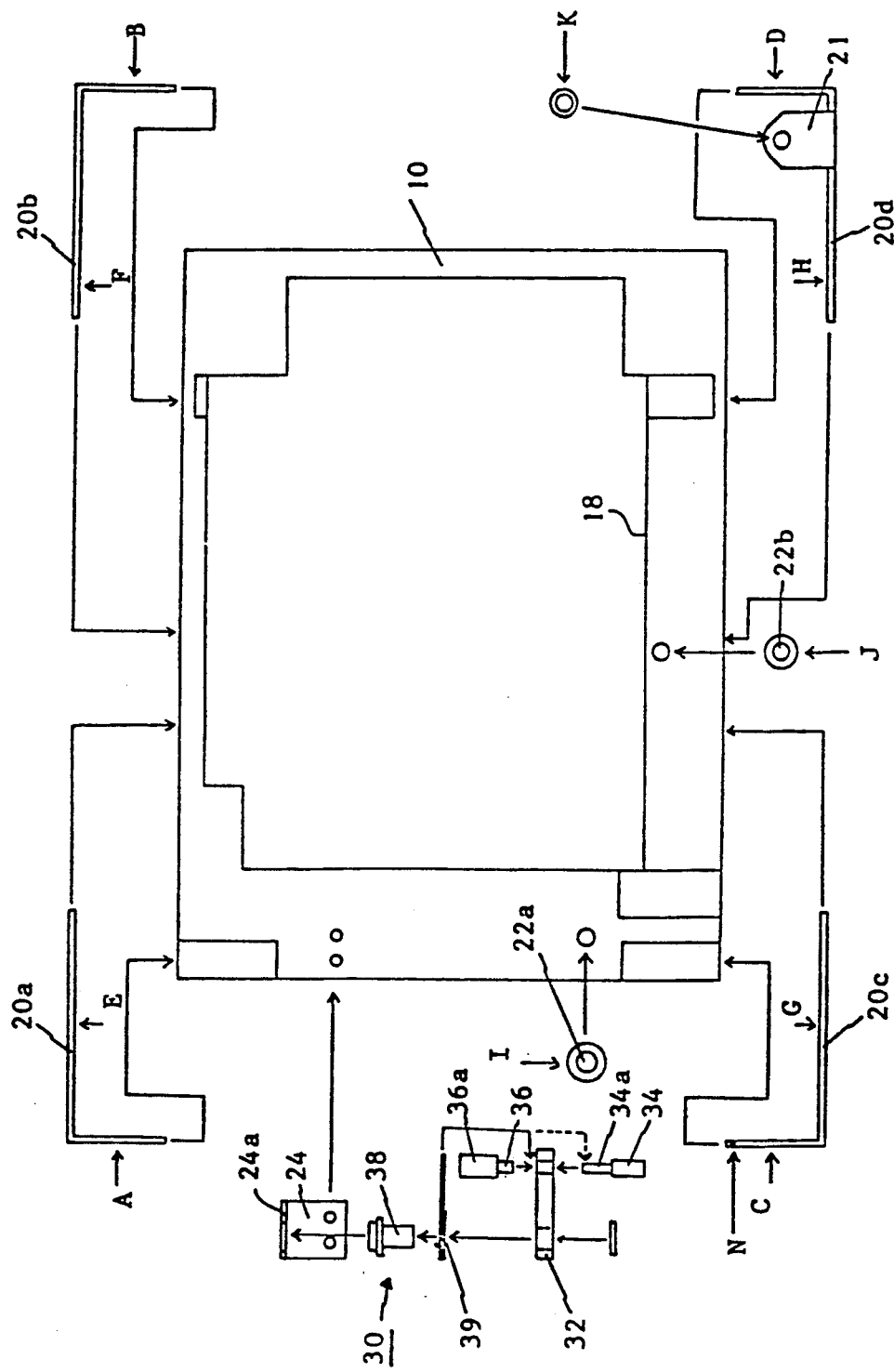
FIGS. 3, 4 and 5 are exploded plan views of a main chassis, a pick-up base and a sliding plate of the disc drive, respectively.

Main chassis 10 is, as particularlly illustrated in FIG. 3, a steel plate having in general a rectangular shape and including a large opening 18 for accommodating the lower part of pick-up base 12. To the four corners of main chassis 10 are secured, by screw means, side chassis 20a, 20b, 20c and 20d respectively, which extend upwardly to form side walls of the apparatus. A pair of guide pins 22a and 22b coupled with elastomeric cover rings (not shown) are planted on the base plate of main chassis 10, which will cooperate with a pair of guide grooves 70a and 70b of sliding plate 16 to guide sliding movement of plate 16 in the loading/unloading direction of the cartridge.

Lock means 30 for locking pick-up base 12 in one extreme position thereof is provided for the leftside (as viewed in FIG. 3) of main chassis 10. This lock means 30 comprises an arm 32, a positioning pin 34 extending through one end of arm 32 and a lock pin 36 fitted to arm 32 below positioning pin 34. A narrow shaft 34a of positioning pin 34 and an enlarged head 36a having a pentagonal cross-section of lock pin 36 (see FIGS. 18 to 20) are both extruded upwardly from arm 32, in the assembled condition of lock means 30. Arm 32 is pivotable about a pin 38 extending through the other end thereof. Pin 38 is secured to an upstanding wall 24a of a L-shaped fixture 24, which is in turn fixed to the base wall of main chassis 10 by suitable screw means (not shown). There is also provided a spring 39 coiled aroung pin 38 and connected between a shaft portion 34a of positioning and an aperture 24b formed in upstanding wall 24a, so that a free end of arm 32 is normally biased downwardly or to rotate in a counter clockwise direction as views in FIGS. 18 to 20.

Figure 4:
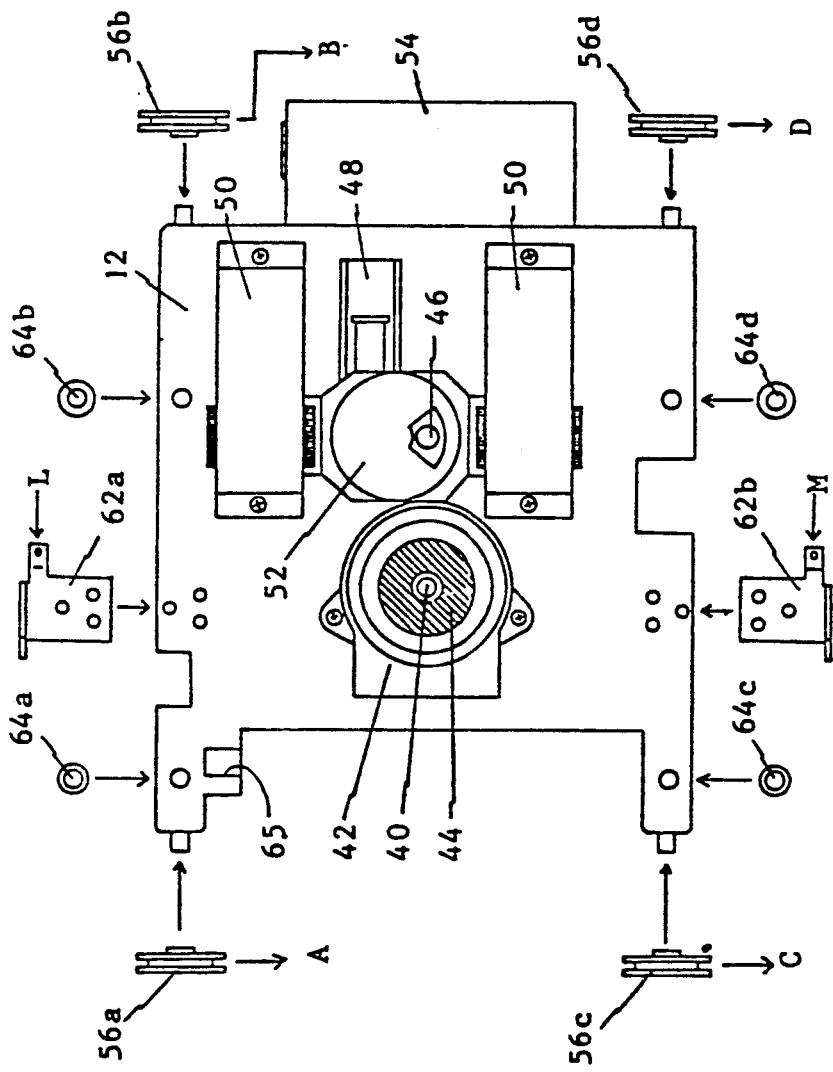

As particularly seen in FIG. 4, on pick-up base 12 there is mounted a known recording/reproducing mechanism which is in operation when the disc cartridge is completely loaded into the apparatus. This mechanism includes a spindle 40 adapted to be inserted into a center hole of the magneto optical disc in the disc cartridge, a motor 42 for driving spindle 40, a magnet 44 for drawing the disc theretoward, and an actuator 52 for irradiating a laser beam spot to a recording/reproducing area of the disc via an object lens 46. Actuator 52 is moveable in the cartridge loading/unloading direction by means of a pair of linear motors 50 with the guidance of guide track 48. To the rear end of pick-up base 12 is attached an optical source 54 on which optical instruments for irradiating the laser beam spot and various circuits (not shown) are mounted.

Figure 7:
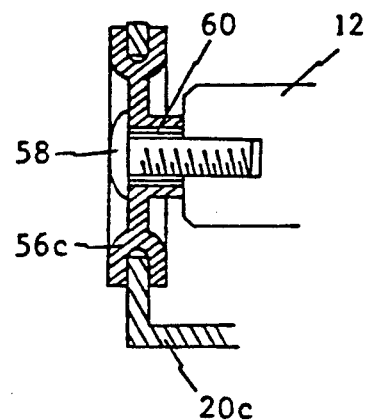
FIG. 7 is an enlarged section illustrating a manner in which the pick-up base is attached to the main chassis.

Pick-up base 12 has a sufficient thickness to provide a degree of strength required for supporting thereon the recording/reproducing mechanism. Pick-up base 12 is supported substantially above main chassis 10 in a manner that dampers 56a, 56b, 56c and 56d attached to the four corners of pick-up base 12 are fitted in corresponding holes provided in side chassis 20a, 20b, 20c and 20d respectively, with the lower portion being protruded into opening 18 of main chassis 10. As best seen in FIG. 7 which typically illustrates relationship between pick-up base 12 and side chassis 20c, damper 56c of elastomeric material is secured to the side periphery of pick-up base 12 by means of a fastening screw 58 and is, in turn, fixed in hole of side chassis 20c. A metal bushing 60 is fitted along the inner wall of a screw insertion hole of damper 56c, thereby preventing axial inward deformation of damper 56c which might otherwise occur when fastened by screw 58. Because of the elasticity of the dampers, in the assembled condition, pick-up base 12 is supported above main chassis 10 while allowing a slight displacement therebetween in a direction perpendicular to the cartridge loading/unloading direction. Thus, a definite relationship in position between the disc and pick-up mechanism, which is required for the recording/reproducing operation, may be maintained even when external force would be applied to main chassis 10.

To the opposite side walls of pick-up base 12 are fixed a pair of guide members 62a and 62b by means of suitable fastening screws. Each guide member includes an upstanding wall for guiding loading chassis 14 therealong. Pins 64a, 64b, 64c and 64d are provided on pick-up base 12 for positioning the disc cartridge in the predetermined loaded position. At one of extensions extending towards the cartridge unloading direction there is formed a notch or recess 65 adapted to receive look pin 36 of pick-up base lock means 30 when the cartridge is ejected.

Figure 5:
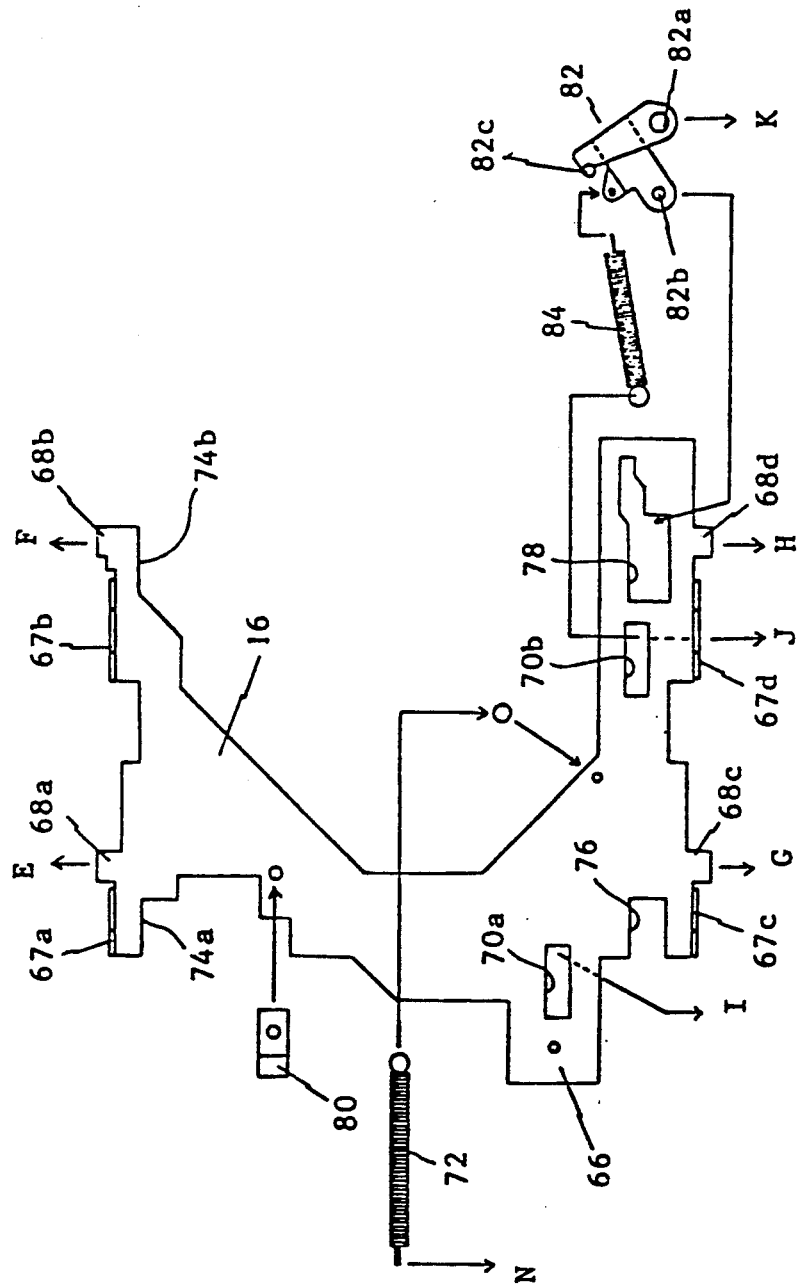

Sliding plate 16 is shaped as shown in FIG. 5, including an ejecting knob 66 at one end thereof, and upstanding walls 67a, 67b, 67c and 67d at opposite sides thereof. Near the respective upstanding walls, there are provided projections 68a, 68b, 68c and 68d to be in engagement with horizontal grooves (not shown) formed in side chassis 20a, 20b, 20c and 20d, which will guide the sliding movement of plate 16 in the cartridge loading-/unloading direction with respect to main chassis 10. To assist the sliding movement of plate 16, guide grooves 70a and 70b are formed for guiding therealong the guide pins 22a and 22b mounted to the base of main chassis 10. During the sliding movement of plate 16, positioning pins 64a and 64b mounted above pick-up base 12 at one side thereof are adapted to be in contact with inner extending edges 74a and 74b respectively, and positioning pins 64c and 64d provided at the other side are adapted to be received in a recess 76 and groove 78 respectively. A spring 72 is connected between one end of side chassis 20c and sliding plate 16 so that sliding plate 16 is normally biased toward the cartridge unloading direction.

A cam member 80 is attached to sliding plate at its one end toward the cartridge unloading direction. This cam member 80 cooperates with lock means 30 to lock pick-up base 12 in a manner described hereinafter. An L-shaped lock member 82 is employed to interlock with sliding plate 16 when the cartridge is in the full-loaded position. Lock member 82 includes one end 82a pivotable connected to an inwardly extending portion 21 of side chassis 20d, and a downward pin 82b provided at the other end to be inserted into guide groove 78. Sliding plate lock member 82 is normally biased to rotate in a counter clockwise direction by means of a spring 84 connected to guide pin 22b protruding upwardly through groove 70b.

Figure 6:
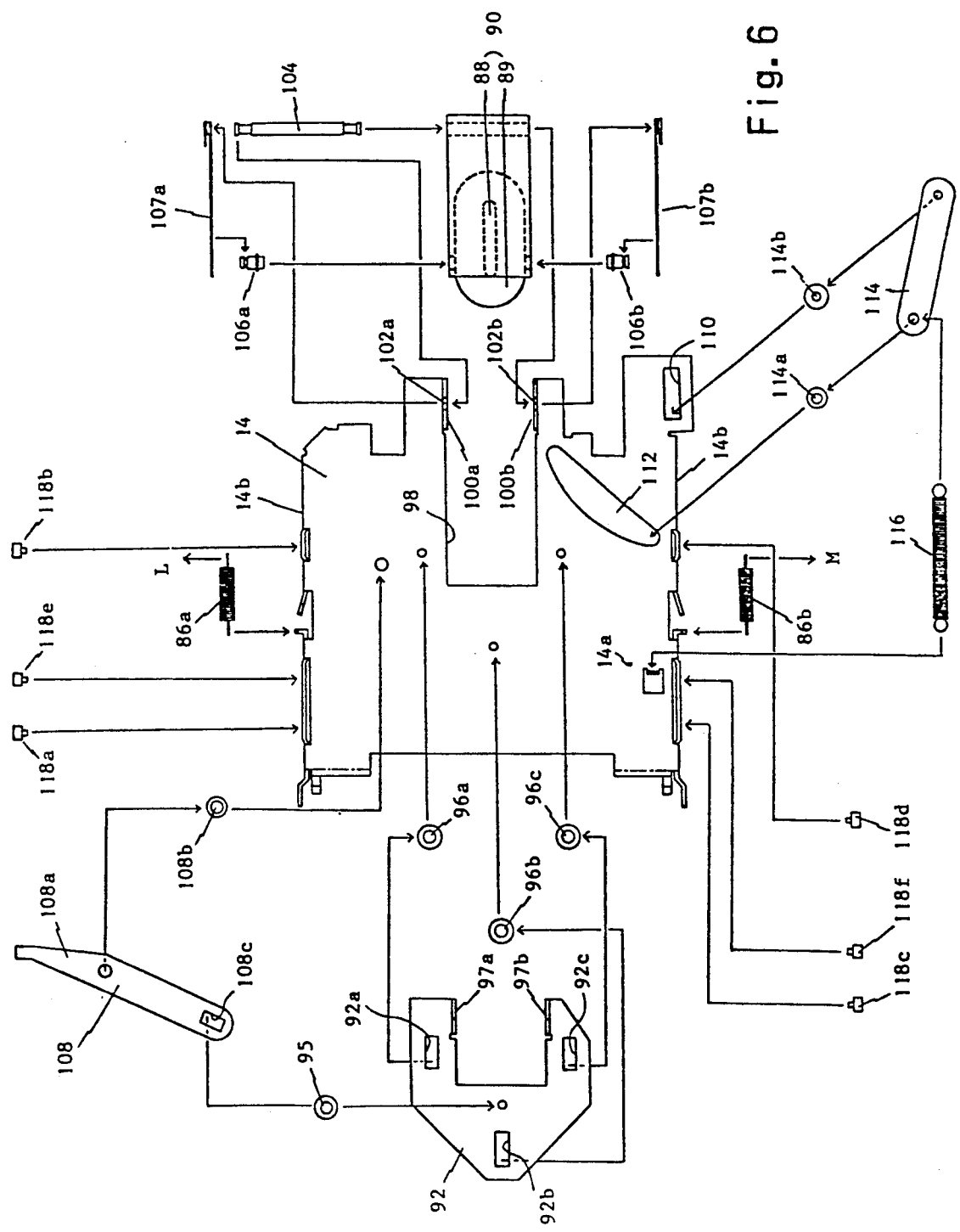
FIG. 6 is an exploded plan view of the loading chassis together with members and elements mounted thereon.

Referring specifically to FIG. 6, loading chassis 14 includes a top plate 14a with the opposite sides being turned down to form a pair of side plates 14b having the lower ends being bent inwardly to provide a space for accommodating the cartridge. Loading chassis 14 remains in its upper position when the cartridge is not contained therein, and is shifted to its lower position upon the insertion of the cartridge. There are provided a pair of springs 86a and 86b connected between opposite side plates 14a and 14b, and guide members 62a and 62b (FIG. 4) respectively, to thereby cause loading chassis 14 to be pulled toward pick-up base 12, so that loading chassis 14 is normally biased to remain stationary in the lower position.

Figure 21:
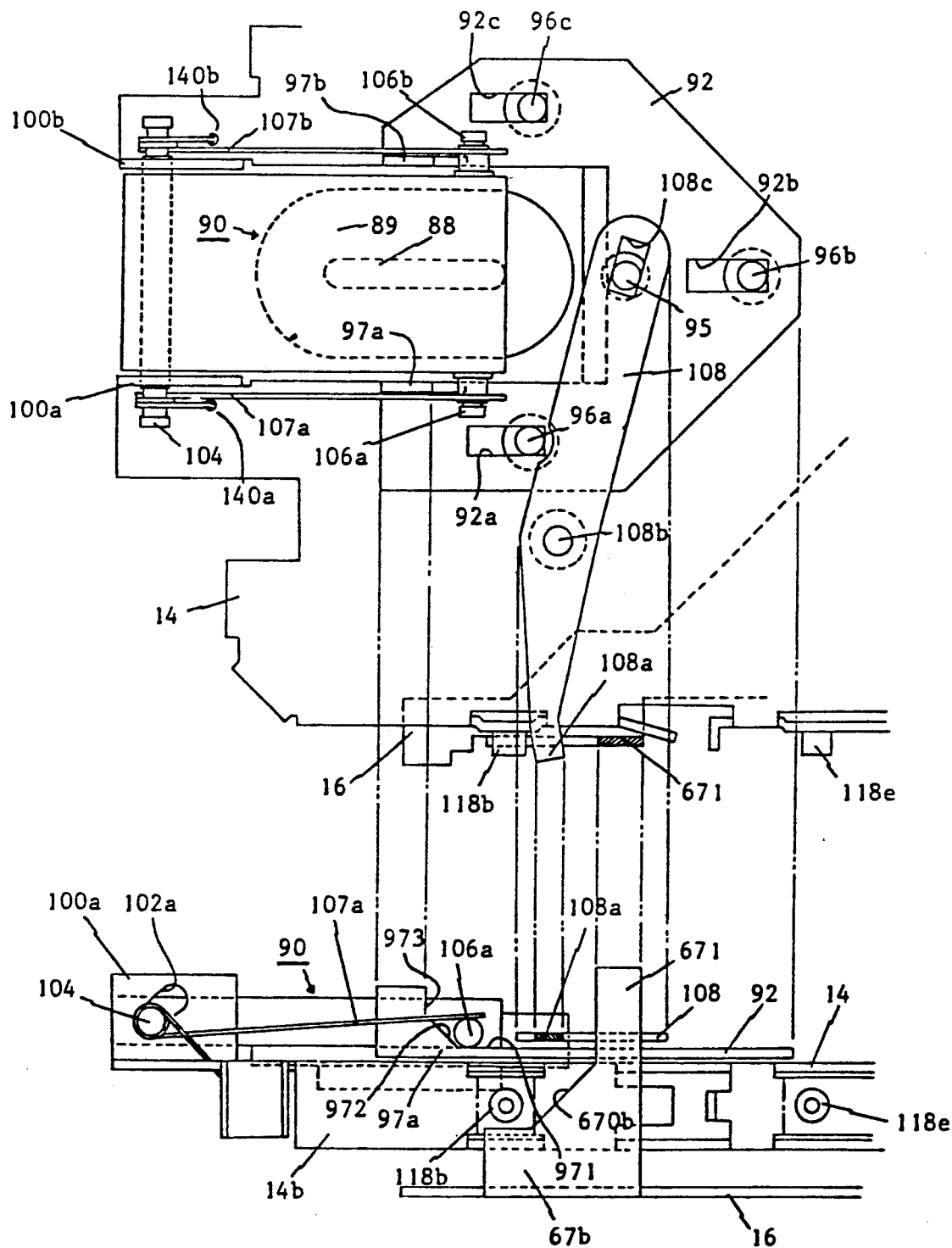
FIGS. 21 through 23 are shifting operation of a bias magnet mounted on the pick-up base along with sliding movement of the sliding plate.
Figure 22:
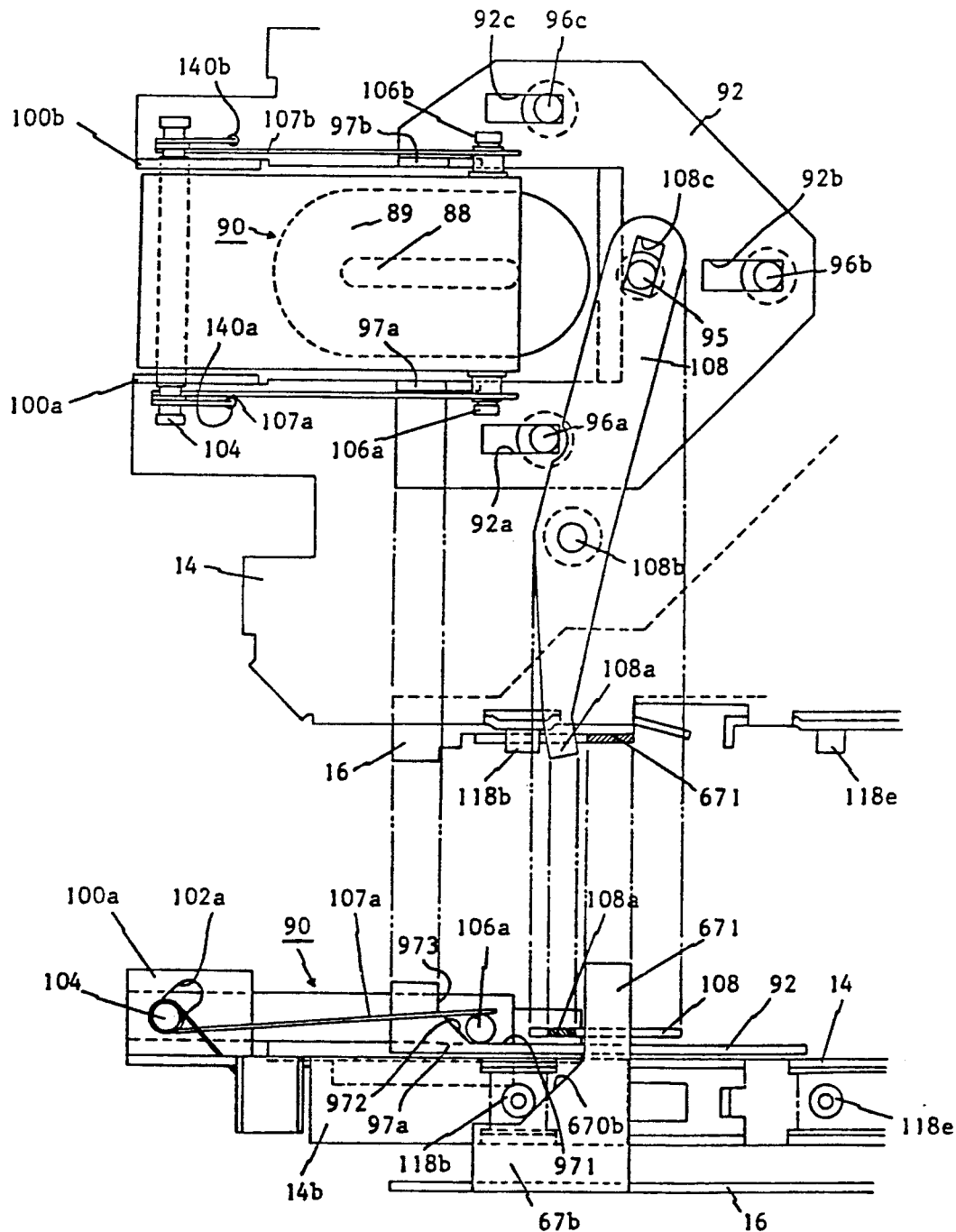
Figure 23:
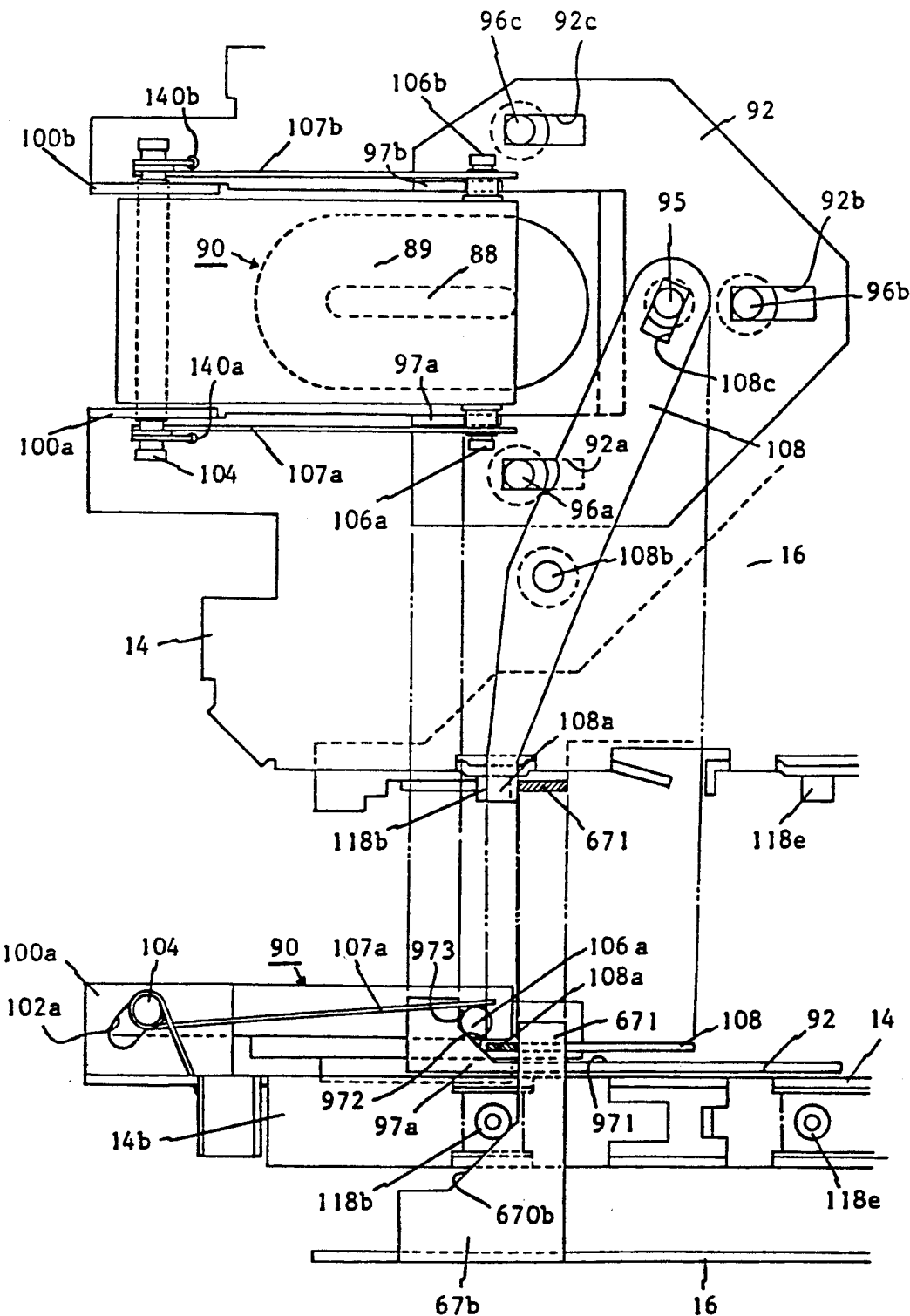

At the rear end of loading chassis 14, there is provided a bias magnet 90 including an E-shaped core 88 and a coil 89, which is adapted to be opposed to the recording/reproducing area of the disc to provide a magnetic field when the cartridge is in the full-loaded condition. Bias magnet 90 will normally stand by in the upper second position and can be moved down to the lower first position for the required recording/reproducing operation. More particularly, guide pins 96a, 96b and 96c are mounted on loading chassis 14 and guided along slots 92a, 92b and 92c formed in a sliding member 92, whereby member 92 is slightly slideable in the cartridge loading/unloading direction with respect to loading chassis 14. The sliding movement of member 92 is governed by an arm 108 including at one end thereof an elongated slot 108c for loosely accommodating a pin 95 mounted on sliding member 92. The other end 108a of arm 108 may be in engagement with an upper edge portion 671 of upstanding wall 67b of sliding plate 16. Arm 108 is pivotable about an axis pin 108b mounted on upper plate 14a of loading chassis 14a. At the rear end of sliding member 92 is provided a recess defined by opposite walls 97a and 97b, each including a horizontal edge 971, an inclined edge 972, and an upstanding edge 973 (FIGS. 21 to 23). At the rear of loading chassis 14 is formed a recess 98 for allowing the magnetic field created by bias magnet 90 to be applied to the recording/reproducing area of the disc. A pair of walls 100a and 100b are upstanding from the rear edges of recess 98. Bias magnet 90 is coupled to loading chassis 14 in such manner that both ends of a connecting pin 104 extending through the rear end of bias magnet 90 are inserted into arcuate slots 102a and 102b formed in upstanding walls 100a and 100b respectively. Position of connecting pin 104 in slots 102a and 102b, and therefore position of bias magnet 90 with respect to loading chassis 14, will depend upon sliding member 92 in a manner described in detail hereinlater. There are provided a pair or outwardly projecting pins 106a and 106b at the fore end of bias magnet 90, which are mounted on cam walls 97a and 97b. As particularly seen in FIGS. 21 to 23, there are also provided a pair of springs 107a and 107b connected between pins 106a and 106b and notchs 140a and 140b formed in loading chassis 14 and coiled around connecting pin 104, whereby pins 106a and 106b are normally positioned in contact with horizontal edge portion 971 of walls 97a and 97b and connecting pin 104 tends to remain stationary in its lowermost position in arcuate slots 102a and 102b (FIGS. 21 and 22).

The notchs 140a and 140b, formed on loading chassis 14 for retaining one end of springs 107a and 107b, are positioned just in the center of arc of slots 102a and 102b respectively, so that the said spring ends would not be moved, even when connecting pin 104 is shifted within arcuate slots 102a and 102b. At one side of recess 98, there is formed in loading chassis upper plate 14a an elongated guide groove 110 and a crescent guide groove 112, into which pins 114b and 114a connected to both ends of an arm 114 are adapted to be inserted respectively. Arm 114 is provided for opening and closing a shutter slideably mounted on the cartridge along with insertion and discharge thereof. Arm 114 is biased toward the cartridge unloading direction by means of a spring 116 so that pins 114a and 114b are normally positioned in the leftmost positions in grooves 112 and 110 respectively, as shown in FIG. 1.

Figure 15:
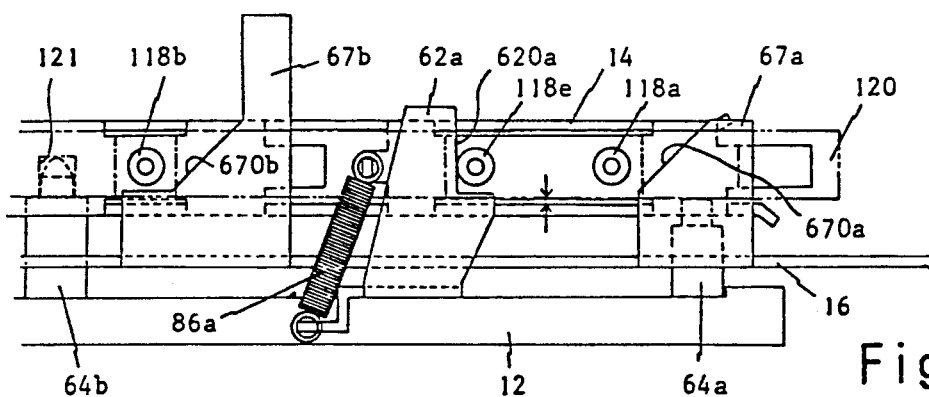
FIGS. 15 through 17 are explanatory plan views illustrating shifting operation of the loading chassis along with sliding movement of the sliding plate.
Figure 16:
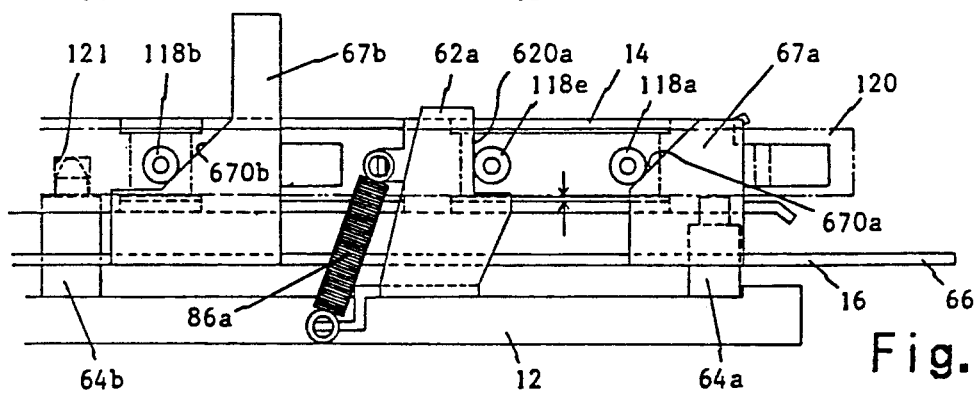
Figure 17:
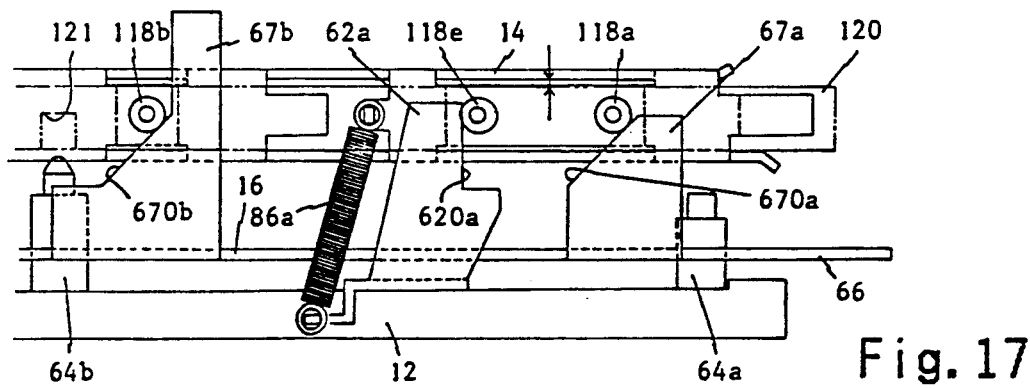

To opposite side plates 14b of loading chassis 14, respective three guide rollers 118a, 118b and 118e; 118c, 118d and 118f are rotatably fitted. Among them, guide rollers 118a, 118b, 118c and 118d are adapted to run along inclined shoulders 670a, 670b, 670c and 670d of side walls 67a, 67b, 67c and 67d of sliding plate 16, respectively, whereas guide rollers 118e and 118f are adapted to be engaged with vertical edges 620a and 620b of guide member 62a and 62b secured to pick-up base 12, respectively (FIGS. 15 to 17). Thus, with the guidance achieved by these guide rollers, loading chassis 14 can be moved up/down along with sliding movement of sliding plate 16.

Figure 1:
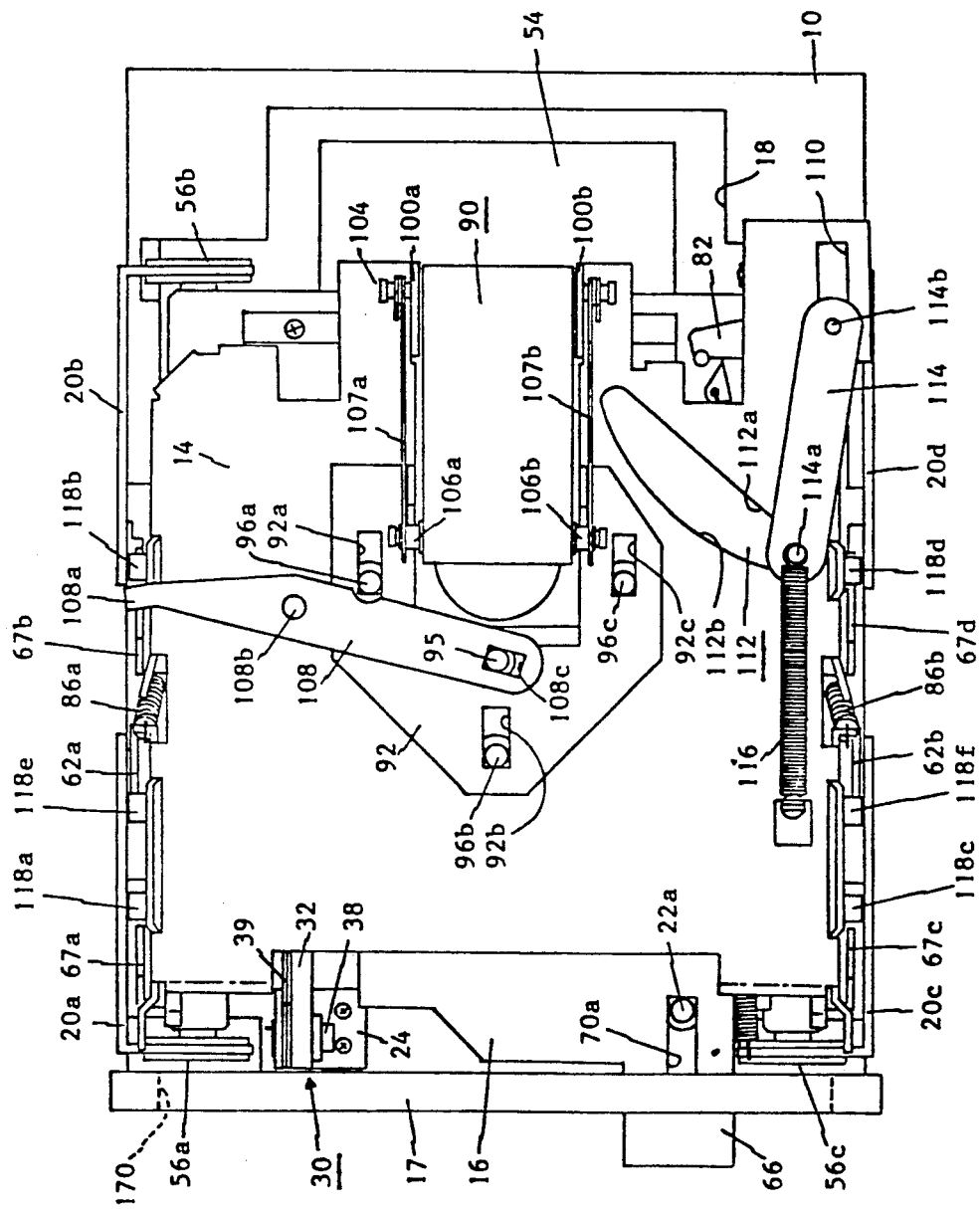
FIG. 1 is a plan view of a disc drive embodying the invention.
Figure 2:
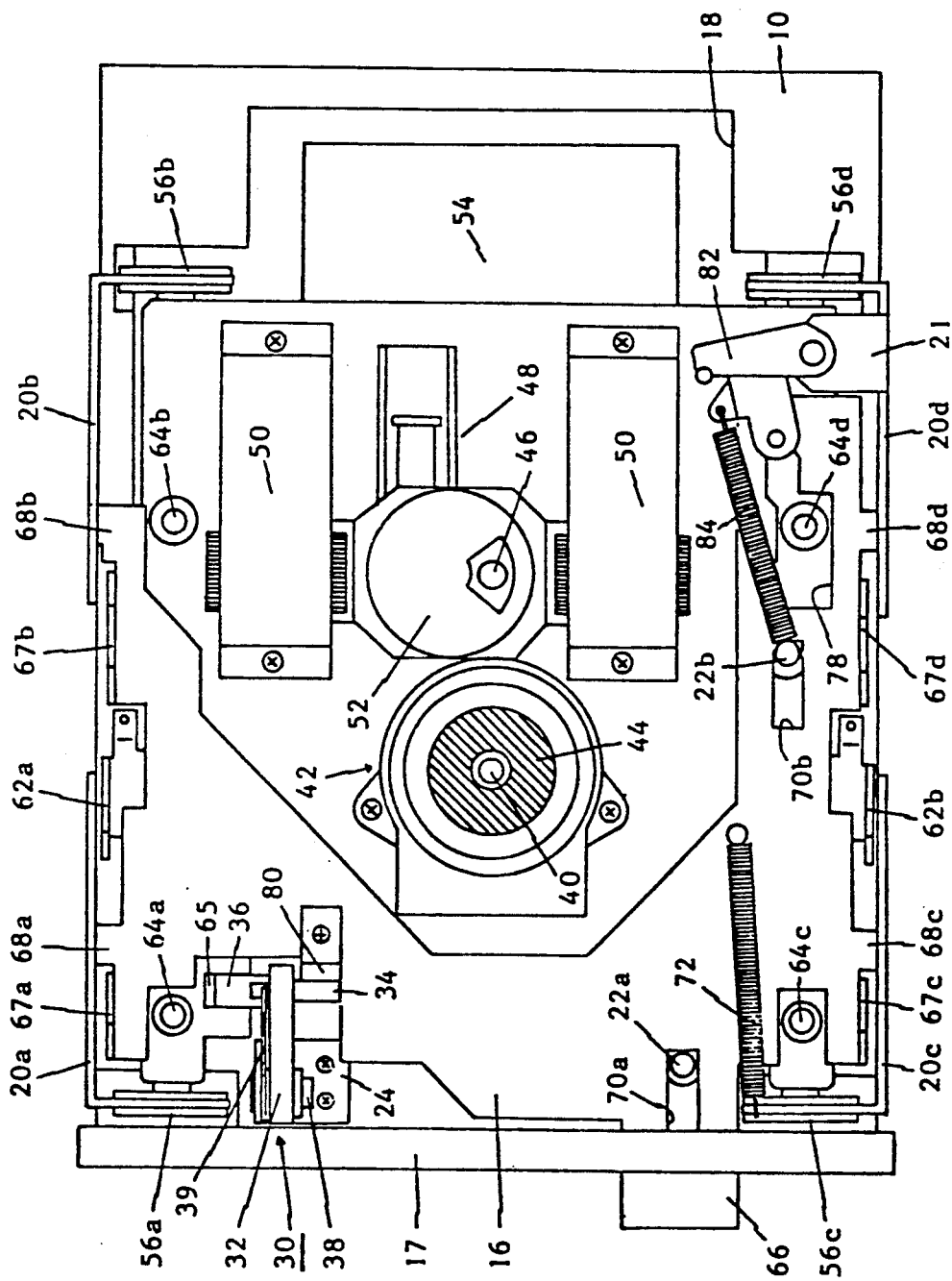
FIG. 2 is a plan view of the disc drive from which a loading chassis is eliminated.

The disc drive embodying the invention is composed of main chassis 10 with a front panel 17 secured to the fore end thereof, pick-up base 12, loading chassis 14 and sliding plate 16, which is illustrated in FIG. 1. In FIG. 2, loading chassis 14 is ommited for better understanding of the assembled condition. The disc drive shown in these figures is in a position ready for required recording/reproducing operation, though the full-loaded cartridge itself is not shown. In this operative condition, sliding plate 16 is in the leftmost position, that is most toward the cartridge unloading direction, and ejecting knob 66 protrudes forward of an opening (not shown) of front panel 17. As known, front panel 17 includes a rectangular port 170 for allowing insertion/discharge of the cartridge. The cartridge accomodating space defined by loading chassis 14 will not coincide with port 170 when loading chassis 14 is shifted down into the lower position in the cartridge full-loaded position as shown in FIGS. 1 and 2. On the other hand, with loading chassis 14 being in the upper position, port 170 will come into alignment with the cartridge accommodating space to allow the cartridge to be inserted into loading chassis through port 170.

The disc drive having the aforementioned construction and arrangement will be operated as follows:

Shutter Actuating Operation

Figure 8:
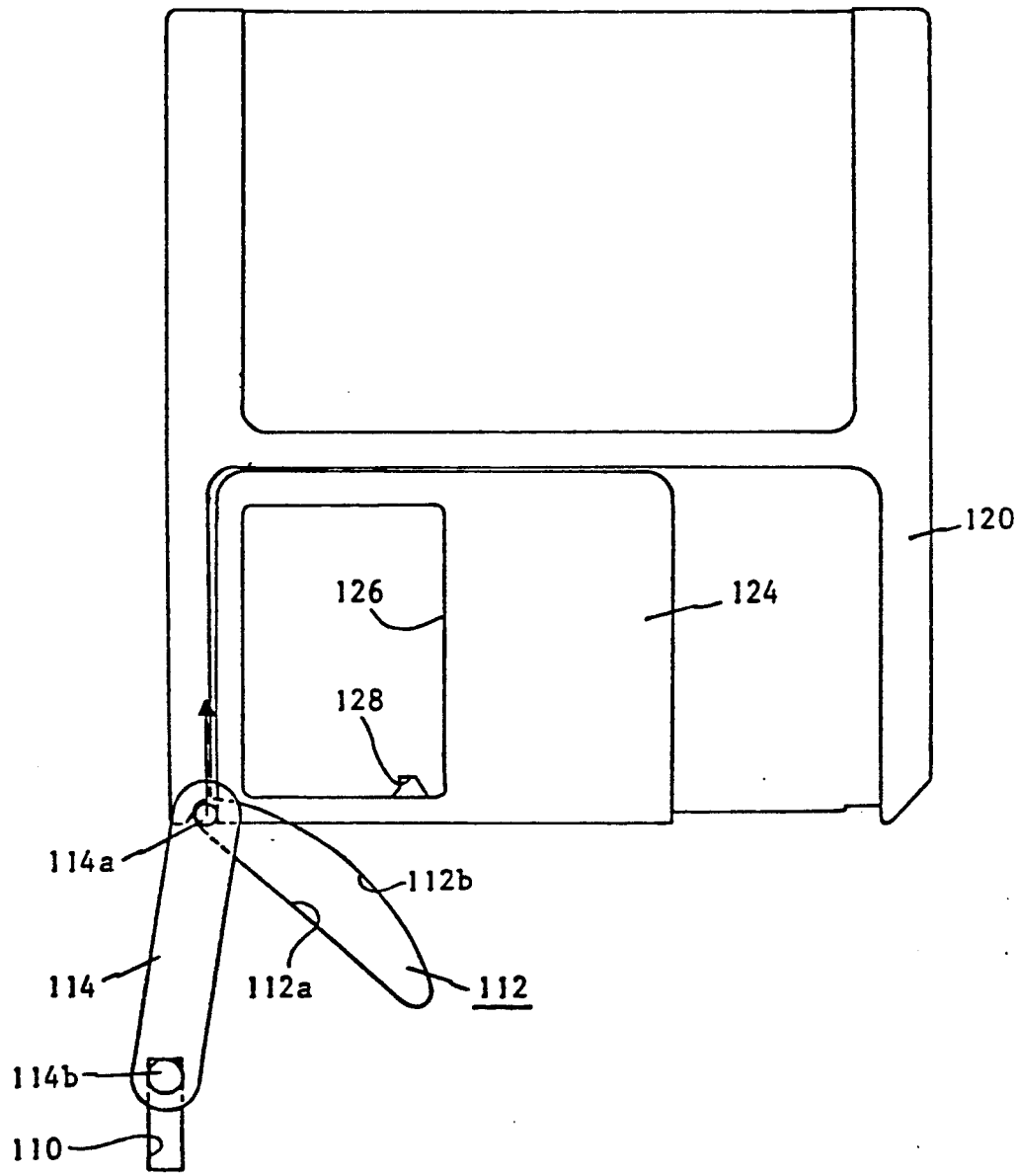
FIGS. 8 through 11 are explanatory plan views illustrating opening operation of a shutter of a disc cartridge along with advancement of the disc cartridge.
Figure 9:
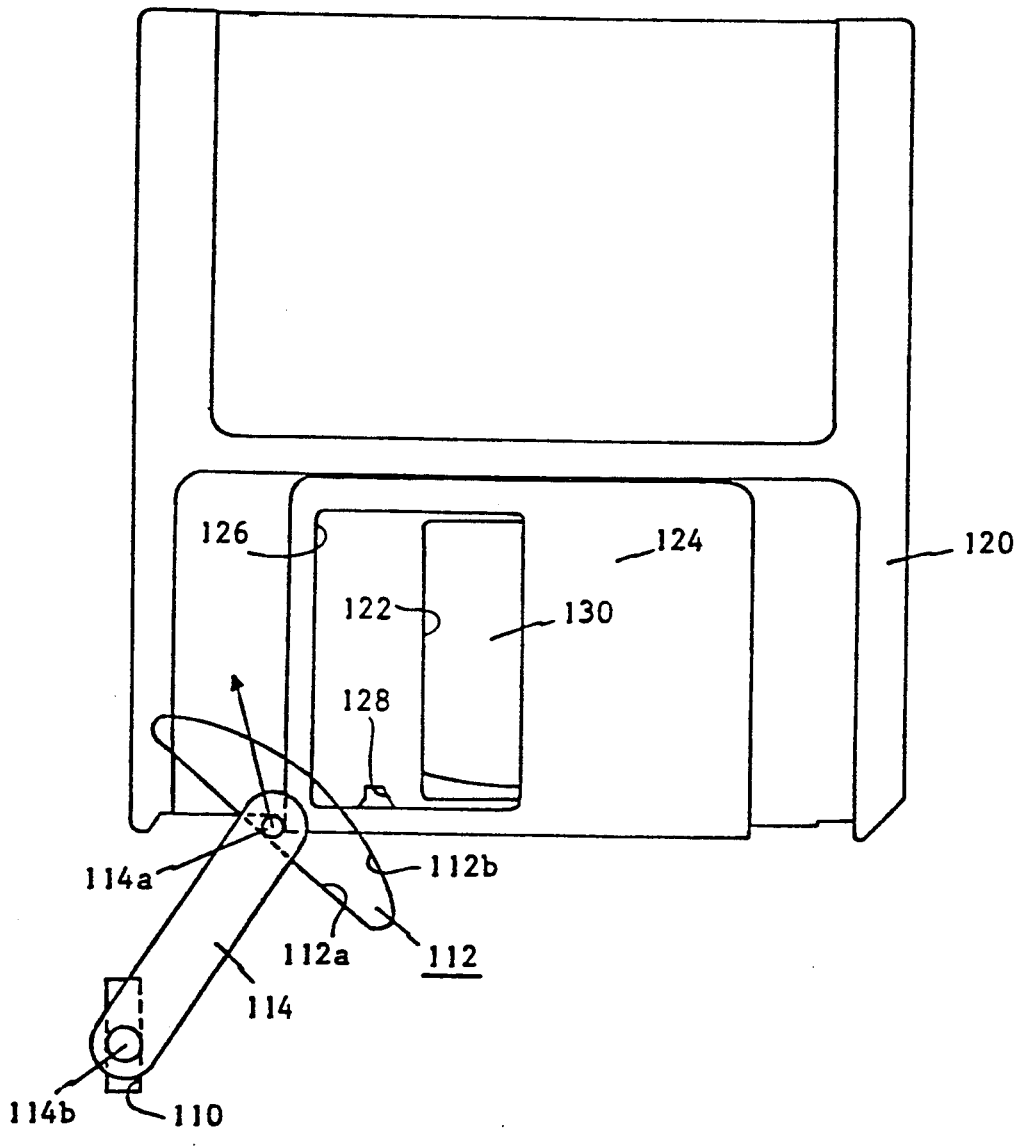
Figure 10:
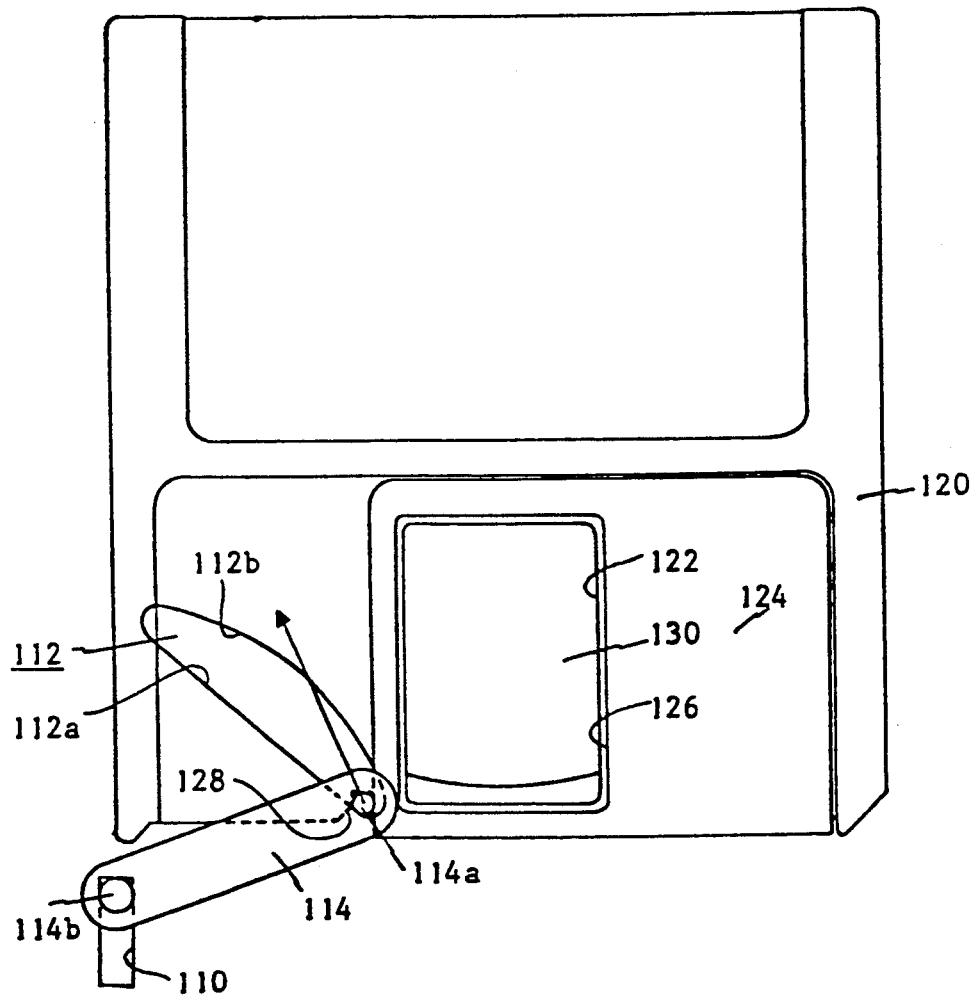

The disc cartridge 120 for use in combination with the disc drive is shown in FIGS. 8 through 11. Cartridge 120 is a substantially flat, box-shaped jacket made from hard plastic material, containing a magneto optical disc 130. The front portion of cartridge 120 is recessed and a shutter 124 is slideably connected to cartridge 120 in the recessed portion. At the center of recess there is formed an access opening 122 which will come into alignment with a shutter window 126 to expose the recording/reproducing area of disc 130 when shutter 124 is moved to the rightmost position (FIG. 10). Shutter 124 is spring-biased toward the leftmost position (FIG. 8) so that the recording/reproducing area of disc 130 is normally covered by shutter 124 for preventing contamination.

Now, the shutter actuating operation will be described in particular reference to FIGS. 8 through 11.

Supposed that loading chassis 14 is in the upper position to provide the cartridge accommodating space which is aligned with cartridge insertion/discharge port 170. In the course of insertion of cartridge 120 through port 170 into the cartridge accommodating space defined by loading chassis 14, the leading edge of cartridge 120 come into contact with pin 114a of shutter actuating arm 114, which extends downward through crescent guide groove 112 to protrude into the cartridge accommodating space (FIG. 8). At this time, pin 114a is in the outermost position within guide groove 112 due to biasing force of spring 116.

Along with further insertion of cartridge 120, pin 114a moves inwardly along the straight extending edge 112a of guide groove 112, thereby shifting shutter 124 to the right. FIG. 9 shows the shutter position when pin 114a is positioned substantially in the middle of straight edge 112a. When pin 114a reaches the rightmost and innermost end of groove 112, as particularly seen in FIG. 10, pin 114a is engaged in the locked condition by a notch 128 formed on the front edge portion of cartridge 120, whereby shutter 124 remains open to expose the recording/reproducing area of disc 130 through cartridge opening 122, and shutter window 126, so that the recording/reproducing operation may be performed.

Figure 11:
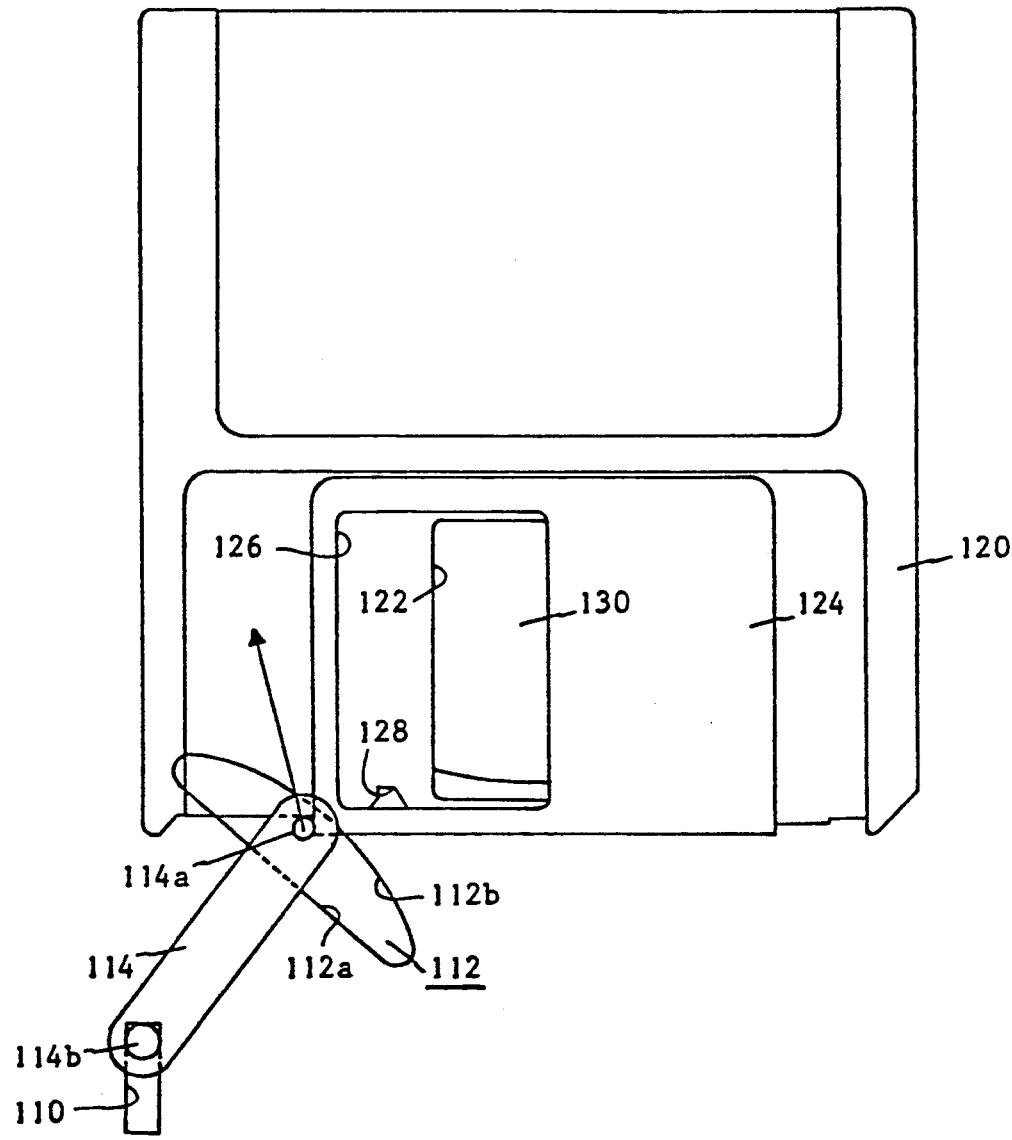

By pushing ejecting knob 66 of sliding plate 16 after the recording/reproducing operation, sliding plate lock member 82 is made operative in a manner described hereinafter to release pin 114a from engagement with notch 128. Thus, arm 114 will be caused by spring 116 to rotate, with the center of rotation being pin 114b located in one extreme end (toward the cartridge discharge direction) of sleight guide groove 110, and pin 114a being moved along arcuate edge 112b of crescent guide groove 112. Such movement of pin 114a will push cartridge 120 toward port 170, and at the same time shift shutter 124 to the closed position. FIG. 11 illustrates that pin 114a returns halfway on arcuate edge 112b. When returning to the situation shown in FIG. 8, cartridge opening 122 is completely closed by shutter 124. Cartridge 120 will be in part protruding from port 170, and can easily be pulled out with the fingers.

Sliding Plate Locking Operation

Although sliding plate 16 is normally biased by spring 72 toward the cartridge unloading direction, when cartridge 120 is not in the full-loaded position, it is retained by lock member 82 to be in the rightmost position. When cartridge 120 reaches the full-loaded position, such locking condition will be released so that sliding plate 16 is sprung back, thereby protruding ejecting knob 66 from front panel 17 for further cartridge ejecting operation.

Now, the sliding plate locking operation will be described in reference to FIGS. 12 to 14. Lock member 82 will, in the cartridge unloaded condition, take a position shown in FIG. 12, wherein pin 82c is in contact with the front edge of loading chassis 14. In this position, pin 82b is in engagement with vertically extending ridge 78a of guide slot 78 formed in sliding plate 16, thereby retaining sliding plate 16 in the locked condition.

Figure 12:
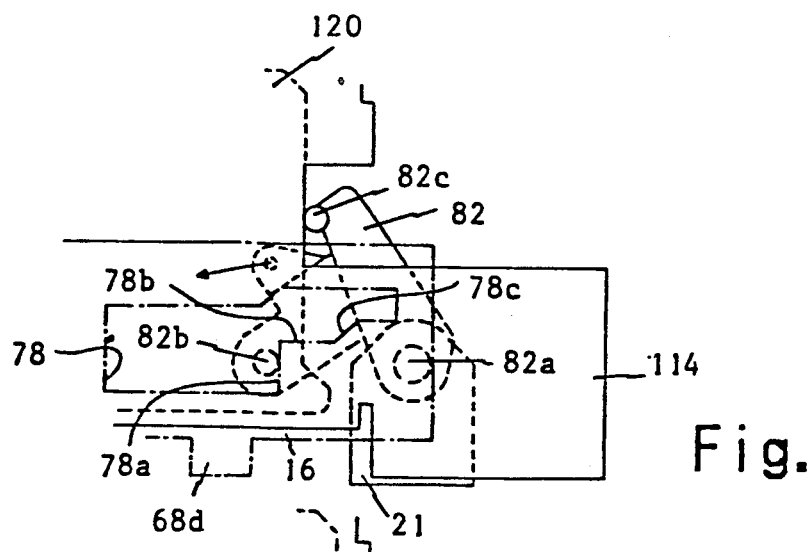
FIGS. 12 through 14 are explanatory plan views illustrating locking operation of the sliding plate along with advancement of the disc cartridge.

Supposed that cartridge 120 has been loaded into the disc drive to a position shown in FIG. 12, wherein the leading edge of cartridge 120 comes into alignment with the front edge of loading chassis 14, and comes into contact with pin 82c. Along with further insertion of cartridge 120, lock member 82 is caused to rotate in the clockwise direction about axis 82a against the biasing force exerted by spring 84. By such rotation of member 82, engagement between pin 82b and ridge 78a may be released so that pin 82b will not be positioned on horizontally extending edge 78b as seen in FIG. 13. Sliding plate 16 is thus unlocked and moved to the left by means of spring 72.

Figure 13:
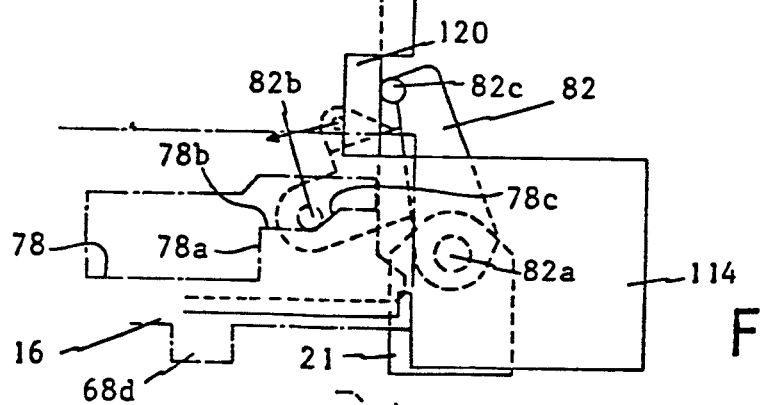

In the position shown in FIG. 13, cartridge 120 has been fully loaded, and can not be shifted further to the right. However, guide slot 78 in sliding plate 16 further extends to the right from horizontal edge section 78b to inclined edge section 78c, whereby sliding plate 16 will be moved further to the left and finally to the leftmost, stand-by position shown FIG. 14. During such further movement of pin 82b along inclined edge section 78c, arm 82 continues to rotate in the clockwise direction so that pin 82c is separated from the leading edge of cartridge 120. This is particularly important because cartridge 120 will remain in the full-loaded position without any physical contact thereto. More specifically, an external force, which might be applied to ejecting knob 66 of sliding plate 16 which extends forward of port 170 in front panel 17, will not be transmitted to cartridge 120, leaving no possibility that the recording/reproducing operation will be affected by vibration of cartridge 120 and/or pick-up base 12.

Figure 14:
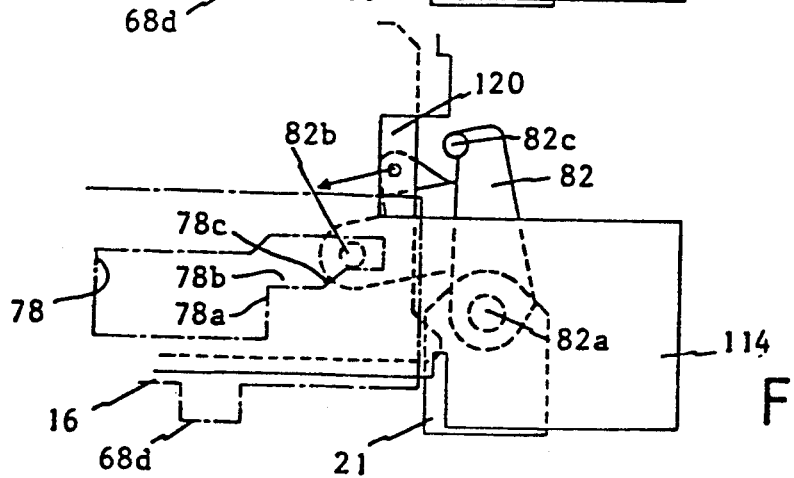

In the course of the cartridge ejecting operation, which starts with advancement of ejecting knob 66, sliding plate 16 is shifted from the rightmost position shown in FIG. 14, via the halfway position of FIG. 13, to the leftmost, stand-by position of FIG. 12 in the locked condition through engagement between pin 82b and edge 78a. When pin 82b, shown resting on horizontal edge 78b in FIG. 13, moves over the corner to the side of engaging edge 78a, spring 84 will cause arm 82 to rotate in the counter clockwise direction by a small angle, thereby pushing cartridge 120 toward discharge port 170. This slight movement of cartridge 120 will be enough that pin 114a of shutter actuating arm 114 is released from engagement with notch 128 of cartridge front edge, thereby allowing shutter 124 to be shifted from the rightmost, open position shown in FIG. 10 toward the leftmost, shut position of FIG. 8.

Loading Chassis Elevating Operation

Loading chassis 14 provides a space for accommodating a disc cartridge, and will, as described hereinbefore, move up and down between the lower position, in which a recording/reproducing operation can be performed, and the upper position, in which the cartridge accommodating space is aligned with insertion/discharge port 170. Loading chassis 14 when in the lower, operative position, ascends to the upper, stand-by position, along with sliding movement of sliding plate 16 which is, in turn, established by pushing operation of ejecting knob 66.

FIG. 15 illustrates the loading chassis 14 which is held in the lower position by means of spring 86a and 86b. At this time, plate 16 is in the unlocked condition (FIG. 14). Guide rollers 118a, 118b, 118c and 118d projecting outwardly from opposite sides of loading chassis 14 are located near inclined shoulders 670a, 670b, 670c and 670d of upstanding walls 67a ,67b, 67c and 67d of sliding plate 16, but are not in contact therewith. Therefore, any external force or vibration that might be applied to, or occur, in sliding plate 16 would not be transmitted to loading chassis 14 via guide members 62a and 62b. Since cartridge 120 may be positioned in loading chassis 14 without being affected by external force or vibration, such undesirable factors will not be applied to pick-up base 12 and actuator 52 mounted thereon via positioning pins 64a, 64b, 64c and 64d. Thus, disc 130 will be maintained in the position required for recording/reproducing operation. Meanwhile, guide rollers 118e and 118f are located in contact with the lower portions of vertical edges 620a and 620b of guide walls 62a and 62b. In the cartridge accommodating space defined within loading chassis 14, cartridge 120 is supported by positioning pins 64a, 64b, 64c and 64d mounted on pick-up base 12 with a predetermined clearance therebetween, while lateral movement of cartridge 120 is prevented by leading ends of positioning pins 64b and 64d protruding into recesses 121 formed in the bottom of cartridge 120. Disc 130 is placed on a turn table (not shown) connected to motor 42, which accesses cartridge 120 through a central aperture thereof (not shown), and is, therefore, rotatably supported in cartridge 120 without any contact therewith.

While ejecting knob 66 is advanced to move sliding plate 16 to the left, guide rollers 118a, 118b, 118c and 118d are guided upwardly along inclined shoulders 670a, 670b, 670c and 670d respectively, thereby causing loading chassis 14 to ascend against the biasing force of springs 86a and 86b. Loading chassis 14 will be moved only in a vertical direction, while lateral movement is prevented due to engagement between guide rollers 118e and 118f, and vertical edges 620a and 620b respectively. Thus, loading chassis 14 ascends to the upper position shown in FIG. 17, through the halfway position of FIG. 16. Since, as having been described, sliding plate 16 is held in the locked condition when loading chassis 14 is in its upper position loading chassis 14 will be maintained in the upper position until cartridge 120 is loaded thereinto to release the locked condition of sliding plate 16. Once sliding plate 16 is released from the locked condition, it is sprung back to the right, during which loading chassis 14 is automatically returned to the lower, operative position of FIG. 15 in a manner substantially reversed from that during the ascending movement described above.

Pick-Up Base Locking Operation

As having been described, pick-up base 12 is not directly fixed to main chassis 10 but connected to side chassis 20a, 20b, 20c and 20d via dampers 56a, 56b, 56c and 56d respectively, providing cushioning effects. Thus, slight displacement of pick-up base 12 can be allowed in a horizontal plane with respect to main chassis 10. With such arrangement, when operating sliding plate 16 to ascend loading chassis 14 from the lower position of FIG. 16 to the upper position of FIG. 17 in the cartridge ejecting operation, there would be a tendency that pick-up base 12 be shifted to the left, due to dampers, under contact between vertical edges 620a and 620b of guide members 62a and 62b and guide rollers 118e and 118f of loading chassis 14, thereby degrading operational touch or feeling. In order to obviate this defect, the disc drive includes lock means 30 for retaining pick-up base 12 with respect to main chassis 10 during the cartridge ejecting operation, that is, between when guide rollers 118a, 118b, 118c and 118d comes into contact with inclined edges 670a, 670b, 670c and 670d, resulting in guide rollers 118e and 118f being brought into contact under pressure with vertical edges 620a and 620b as shown in FIG. 16 and when the cartridge ejecting operation has been completed to shift loading chassis 14 to the upper position as shown in FIG. 17. Such pick-up base locking operation will now be described in reference to FIGS. 18 through 20 which illustrates elements concerned in the same stages shown in FIGS. 15 to 17 respectively.

Figure 18:
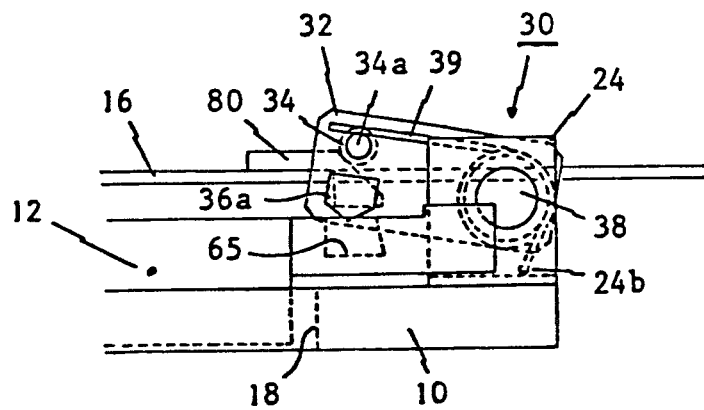
FIGS. 18 through 20 are explanatory plan views illustrating locking operation of the pick-up base along with sliding movement of the sliding plate.

While arm 32 of pick-up base lock means 30 will normally be biased by spring 39 to rotate in the counter clockwise direction, in the cartridge full-loaded condition seen in FIG. 18, positioning pin 34 is positioned on inclined cam face 80a of cam member 80 mounted on sliding plate 16 which remains at this time in the leftmost, standby position. Enlarged head 36a of lock pin 36 is not received in recess 65 formed in pick-up base 12 at this time. Therefore, pick-up base lock means 30 is made inoperative to allow slight displacement of pick up base 12 with respect to main chassis 10 in a horizontal plane, which is effected by dampers 56a, 56b, 56c and 56d to protect actuator 52 and disc 130 from mechanical oscillation or vibration that might possibly applied to pick-up base 12 via ejecting knob 66 of sliding plate 16.

Figure 19:
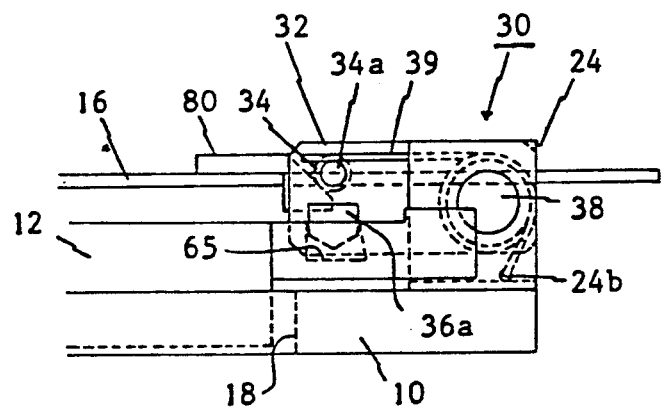

During further advancement of sliding plate 16, positioning pin 34a slips down inclined face 80a so that arm 32 is caused by spring 39 to rotate in the counter clockwise direction about shaft 38, which results in enlarged head 36a of lock pin 36 being engaged in recess 65, as clearly seen in FIG. 19, to thereby retain pick-up base 12 in position relative to main chassis 10. At this stage, loading chassis 14 remains stationary in the lower position (FIG. 16). Still further advancement of sliding plate 16 will ascend loading chassis to the upper position, during which pick-up base 12 is kept in the locked condition, making dampers inoperative. More precisely, while pushing ejecting knob 66 to advance sliding plate 16, pick-up base 12 is first brought into the locked condition, and then loading chassis 14 is shifted to the upper position while remaining the locked condition of pick-up base 12.

Figure 20:
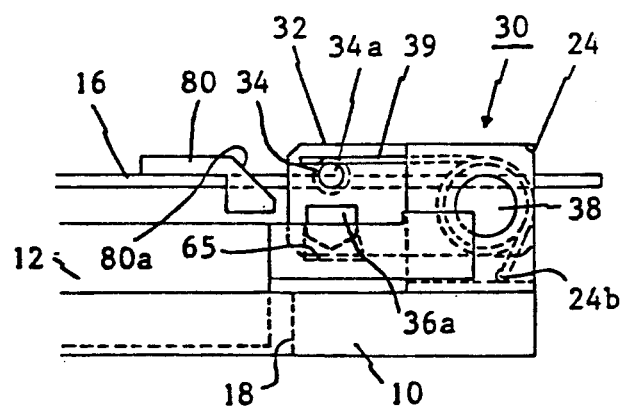

When cartridge 120 is loaded into loading chassis 14 in the upper position shown in FIG. 20, sliding plate 16 is released from the locked condition achieved by lock member 82 and therefore moved to the left by means of spring 72, so that pick-up base locking means 30 will be automatically returned to the position shown in FIG. 18.

Bias Magnet Shifting Operation

Bias magnet 90, mounted on loading chassis 14, is moved up/down together with the latter. As in conventional disc recorders, bias magnet 90 must be positioned with a predetermined clearance from the disc face so that an optimum bias magnetic field is applied to the recording area of disc 130 for performing a recording operation. Such a clearance between the bias magnet and disc face will be rather small, so that a magnetic pole of bias magnet 90 protruding into the cartridge accommodating space in loading chassis 14 would be a hindrance to the cartridge inserting operation. In anticipation of such a defect, bias magnet 90 in this embodiment is designed to be shiftable in a vertical direction relative to loading chassis 14 along with insertion/discharge of cartridge 120. More particularly, bias magnet 90 will be in a retracted (second) position above from loading chassis 14 when the latter is in the upper position, and descends closer to loading chassis 14 as the latter descends. When loading chassis 14 reaches the lowermost position, bias magnet 90 moves to be its lowermost (first), operative position providing a predetermined clearance from loading chassis 14.

In the cartridge full-loaded condition shown in FIG. 21, free end 108a of arm 108, pivotally mounted on loading chassis 14, is not in contact with upper end 67l of upstanding wall 67b of sliding plate 16. Pins 106a and 106b, protruding outwardly from one end of bias magnet 90, are biased downwardly by springs 107a and 107b respectively so that these pins are located just before cam edges 97a and 97b of slider 92. Pin 104 extending through the other end of bias magnet 90 is also biased downwardly by the same springs to be supported by opposite upstanding walls 100a and 100b at the lowermost ends of arcuate slots 102a and 102b formed therein respectively. Thus, bias magnet 90 is in the lower, operative position close to loading chassis 14.

It will be understood that in this cartridge full-loaded condition, arm end 108a is maintained free from contact with any portion of sliding plate 16, whereby external force or oscillation that might be caused by accidental touch of sliding plate 16 will not be transmitted to disc 130, actuator 52 and bias magnet 90 which can therefore be kept in definite relative positions.

Sliding plate 16 advances from the cartridge full-loaded condition to the halfway condition shown in FIG. 22 wherein upper end 67l just comes into contact with arm end 108a. Bias magnet 90 and slider 92 remain stationary.

Along with further advancement of sliding plate 16 which causes arm 108 to rotate in the clockwise direction about axis pin 108b due to engagement of arm end 108a and sliding plate upper end 67l, sliding member 92 attached on sliding plate 16 will be moved to the right, that is in a direction opposite to the sliding plate advancing direction, with guide pins 96a, 96b, 96c and 96d planted on loading chassis 14 being guided along slots 92a, 92b, 92c and 92d formed in slider 92 respectively. Thus, pins 106 and 106b of bias magnet 90 runs up on inclined cam portions 97a and 97b, and bias magnet 90 rotates in the counter clockwise direction about connecting pin 104, still remaining at this time in the lower ends of arcuate slots 102a and 102b. Such rotation of bias magnet 90 will continue until pins 106a and 106b come into engagement with vertically extending portions of walls 97a and 97b. Along with further advancement of sliding plate 16, and incidental movement of slider 92, bias magnet 90 is pulled to the right with pins 106a and 106b being in constant engagement with vertical edge portions of walls 97a and 97b. At the same time, the opposite end of bias magnet 90 is lifted in such a manner that both ends of connecting pin 104 are guided along arcuate slots 102a and 102b toward the upper ends thereof. As a consequence of successive movements as above described, bias magnet 90 is shifted from the lower, operative position of FIG. 21, to the upper, inoperative position, of FIG. 23 in a parallel ascending fashion. Since sliding plate 16 is retained in the locked condition at the time when bias magnet 90 reaches the upper position, the bias magnet can be held in the upper position as long as cartridge 120 is not inserted into loading chassis 14. Upon insertion of cartridge 120, sliding plate 16 is sprung back in the cartridge unloading direction and accordingly bias magnet 90 is returned to the lower, operative position shown in FIG. 21.

While the invention has been described in conjunction with a specific embodiment thereof, it is to be understood that many modifications and variations can be made without departing from spirit and scope of the invention as defined in the appended claims. This invention can also be applied to a disc drive for use in connection with another type of disc cartridges containing floppy discs or magnetic disc, in which cases the pick-up mechanism will be composed of a magnetic head, a stepping motor, etc.

What is claimed is:

1. A recording and/or reproducing apparatus comprising:
   (a) a main chassis on which recording and/or reproducing mechanisms, including a pick-up mechanism, are mounted;
   (b) a loading chassis above said pick-up mechanism and adapted to accommodate a disc cartridge, said loading chassis being shiftable between a loading position in which said recording/reproducing operation can be performed with respect to a disc contained in said disc cartridge, and an unloading position retracted away from said pick-up mechanism;
   (c) a bias magnet mounted on said loading chassis for applying a magnetic field to the disc and shiftable between an operative position closer to said disc when said loading chassis is in its loading position, and a stand-by position retracted away from the disc when said loading chassis is in said unloading positions
   (d) a sliding plate arranged on said main chassis and slidable between a first position and a third position, through a second, intermediate position;
   (e) a shift mechanism for shifting said bias magnet between said operative and said stand-by positions mounted on said loading chassis;
   (f) link means for actuating said shift mechanism in response to contact with, and movement by, said sliding plate during movement thereof between said first and said second positions; and
   (g) said loading chassis being moved from said unloading position to said loading position in response to insertion of said disc cartridge, the insertion of said disc cartridge causing said sliding plate to move from its first position to its second position, said loading chassis then being kept stationary at said loading position while said sliding plate continues to move to said third position, out of contact with said loading chassis, thereby keeping said sliding plate out of contact with said loading chassis and preventing any external force which may be applied to said sliding plate from affecting said recording/reproducing operation.

2. Apparatus according to claim 1, wherein said pick-up mechanism is supported substantially above said main chassis through damper means.

3. Apparatus according to claim 1, wherein said link means includes an arm member pivotably connected to said loading chassis and adapted to be brought into contact with said sliding plate, said arm member remaining out of contact with said sliding plate when said sliding plate is in said third position.

4. A recording and/or reproducing apparatus comprising:
   (a) a main chassis;
   (b) a pick-up base on which a recording/reproducing mechanisms, including a pick-up mechanism, are mounted;
   (c) damper means arranged between said main chassis and said pick-up base for preventing an external force supplied to said main chassis from being transmitted to said pick-up base;
   (d) a loading chassis supported above said pick-up mechanism and adapted to accommodate a disc cartridge and shiftable between a loading position in which said recording/reproducing operation can be performed with respect to a disc contained in the disc cartridge, and an unloading position retracted away from said pick-up mechanism;
   (e) a bias magnet mounted on said loading chassis and shiftable between an operative position closer to a disc contained in said loading chassis, and a stand-by position retracted away from the disc;
   (f) guide means for guiding said loading chassis between a loading position wherein said recording reproducing operation can be performed with respect to the disc, and an unloading position retracted away from said pick-up base;
   (g) a shift mechanism mounted on said loading chassis for shifting said bias magnet between said operative and said stand-by positions;
   (h) a sliding plate arranged shiftably with respect to said main chassis and including an inclined cam cooperating with said guide means to shift said loading chassis between said loading and said unloading positions thereof, said inclined cam being separated away from said loading chassis when said loading chassis remains in said loading position thereof;
   (i) a plurality of support pins mounted on said pick-up base for supporting and positioning said cartridge when said loading chassis is located in said loading position: and
   (j) link means mounted on said loading chassis for actuating said shift mechanism by contact with, and movement by said sliding plate, during movement thereof between said first and said second positions.

5. A recording and/or reproducing apparatus comprising:
   (a) a main chassis on which recording an/or reproducing mechanisms, including a pick-up mechanism, are mounted;
   (b) a loading chassis adapted to accommodate a disc cartridge and shiftable between a loading position in which said recording/reproducing operation can be performed with respect to a disc contained in a disc cartridge, and an unloading position retracted away from said pick-up mechanism;
   (c) a bias magnet mounted on said loading chassis for applying a magnetic field to the disc, and shiftable between an operative position closer to the disc when said loading chassis is in said loading position, and a stand-by position retracted away from the disc when said loading chassis is in said unloading position;
   (d) a sliding plate arranged on said main chassis, slidably movable to a first position and a third position, through a second, intermediate position;
   (e) a sliding member mounted on said loading chassis and cooperating with said sliding plate for shifting said bias magnet between said operative and stand-by positions during movement of said sliding plate between said first and second positions; and
   (f) said loading chassis being moved from said unloading position to said loading position in response to insertion of said disc cartridge, the insertion of said disc cartridge causing said sliding plate to move from its first position to its second position, said loading chassis then being kept stationary at said loading position while said sliding plate continues to move to said third position, out of contact with said loading chassis, thereby keeping said sliding plate out of contact with said loading chassis and preventing any external force which may be applied to said sliding plate from affecting said recording/reproducing operation.

* * * * *